April 4, 1967 H. BORCHARD ETAL 3,311,951
RELEASE MEANS
Filed March 15, 1965 2 Sheets-Sheet 1
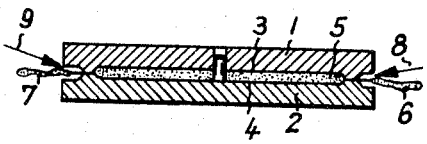
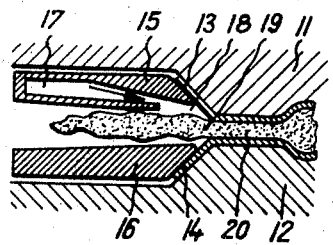
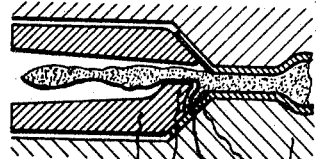
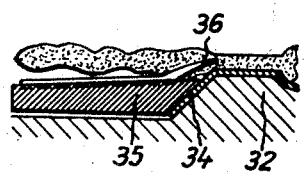
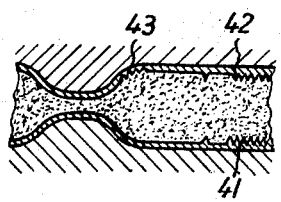
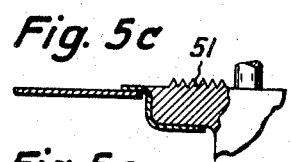
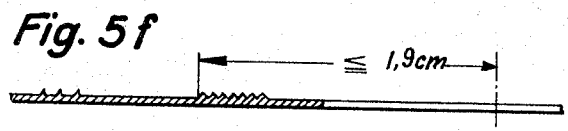
Inventors
Heinz Borchard
Eggert Herrmann
By Spencer & Kaye
Attorneys

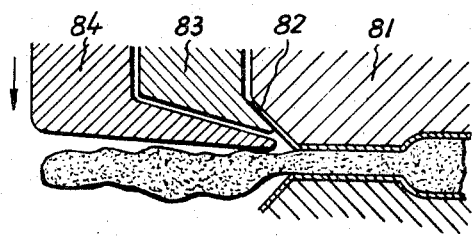
Fig. 6a
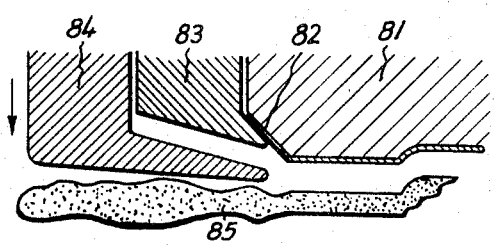
Fig. 6b
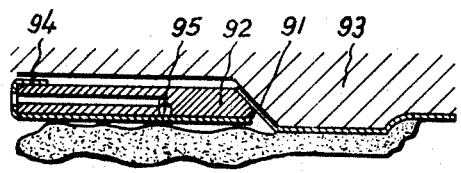
Fig. 7a
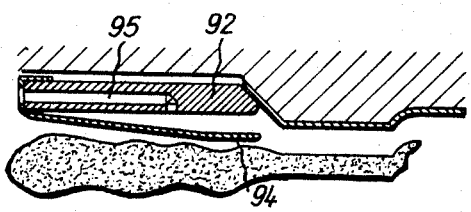
Fig. 7b
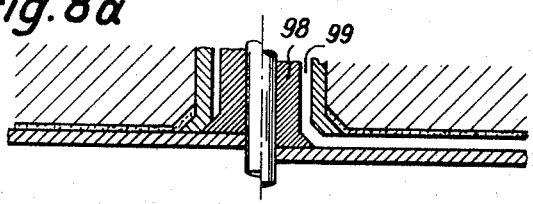
Fig. 8a
Fig. 8b
Inventors:
Heinz Borchard
Eggert Herrmann
By Spencer & Kaye
Attorneys United States Patent Office 3,311,951
Patented Apr. 4, 1967

3,311,951
RELEASE MEANS
Heinz Borchard and Eggert Herrmann, both of Nortorf, Holstein, Germany, assignors to Teldec-Telefunken-Decca-Schallplatten G.m.b.H., Hamburg, Germany
Filed Mar. 15, 1965, Ser. No. 439,691
Claims priority, application Germany, Mar. 16, 1964,
T 25,826
3 Claims. (Cl. 18—5.3)

The present invention relates to a record mold which includes means for releasing the pressed record from one stamper, so that the record always remains on the other stamper—and thus on a predetermined side of the mold—after a pressing operation.

This is required, for example, in the automatic mass production of records, wherein each record is moved forward through the process by means of automatic machinery. Even when records are produced by hand, more efficient operation can be obtained if the pressed record always lies on a predetermined stamper.

It is therefore an object of the present invention to provide a record press in which a record is formed by means of stampers, in the form of a mold, and which includes a device for releasing the pressed record, from one of the stampers when the mold is opened.

It is a further object of the present invention to provide a record press wherein the pressed record is left on the same predetermined side of the mold after each pressing operation.

These objects as well as others are achieved according to the present invention, wherein various means are provided for releasing a pressed record from a predetermined one of the mold halves, or stampers, so that the record is always retained on the other mold half, or stamper.

Additional objects and advantages of the present invention will become apparent upon consideration of the following description when taken in conjunction with the accompanying drawings in which:

FIGURE 1 is a cross-sectional view of a two-element record mold.

FIGURES 2 through 5b are cross-sectional views of a portion of a mold similar to that shown in FIGURE 1, showing various means for retaining a pressed record in one stamper.

FIGURES 5c, 5d and 5e are cross-sectional views showing other retaining means, in the central region of the mold.

FIGURE 5f is a cross-sectional view of a portion of a record showing how it may be treated so as to be retained on one stamper.

FIGURES 6 through 8 are cross-sectional views showing various means for releasing a record from a given one of the mold halves.

FIGURE 1 shows a record mold which has two elements, in which a mass of record molding mixture (a "biscuit") has been placed and pressed. The mold includes mold halves 1 and 2, on which stampers 3 and 4, which contain the impression to be cut in the record, are located. The record 5 is pressed between the two stampers, whereby a rim 6, 7, is formed around the mold from the biscuit. The arrows 8 and 9 schematically represent supply lines for pressurized gas, which is forced in the direction of the arrows when the mold is opened to force the record against the lower mold half 2.

FIGURE 2 illustrates an embodiment for pneumatically releasing the record from the upper stamper. The mold comprises two halves 11 and 12, on which stampers 13 and 14 are located. These stampers are clamped to the respective mold halves by fastening rings 15 and 16. The upper fastening ring 15 for stamper 13 has a channel 17, which opens into one or more nozzles 18. After a record is pressed, gas is forced through these nozzles 18 and is guided by the record rim 19, formed during pressing, between the upper stamper and the pressed record. The record 20 is thereby released from the upper stamper 13 and pressed against the lower stamper 14.

FIGURES 3 through 5 illustrate embodiments of the invention in which the record is mechanically anchored to one side of the mold during the pressing operation. In the embodiment shown in FIGURE 3, mechanical anchoring of the record to the lower fastening ring 25, which holds the lower stamper 24 on mold 22, is effected by a recess 26 which forms one or more holding projections 27. During the pressing operation a portion of the molding mixture which emerges from the mold flows behind these projections into the recess 26, so that the record is retained in the mold half 22 when the mold is opened.

The record is similarly mechanically anchored to one side of the mold in the embodiment of FIGURE 4. The fastening ring 35 for the lower stamper 34 of mold half 32 is provided with one or more projections 36, which may be mounted on the fastening ring 35 by any desired means, for instance, by bolts or screws. As the record is pressed, a part of the molding mixture forced out of the side of the mold flows into the spaces formed by these projections 36, so that after the material hardens, the record remains firmly anchored to mold half 32 when the mold is opened.

Still another way by which the record may be mechanically anchored to one mold half is illustrated in FIGURES 5a through 5f. A portion of one of the stampers, which portion is free of sound grooves, is roughened or provided with indentations, which increases adhesion between this stamper and the record to such a degree that the record is retained by the stamper when the mold is opened. In FIGURE 5a, the lower stamper 41 is provided only with grooves in which sound has been recorded. The upper stamper 42, however, in addition to grooves in which sound is recorded, has a roughened portion 43 into which molding material flows to provide a firm mechanical bond between the pressed record and stamper 42 when the mold is opened. FIGURE 5b shows the outer rim of the upper stamper, which has been roughened or provided with grooves, causing the pressed record to adhere to it when the mold is opened. Such roughening or grooves for improving adhesion may be produced galvanically.

As shown in FIGURE 5c, the pressed record may be anchored to one side of the mold by means of a roughened surface 51 in the central region of the stamper. Instead of roughening, the same region may be provided with locking grooves 61, as shown in FIGURE 5d. In still another embodiment, boreholes 71 may be provided in the central region of the mold to firmly mechanically anchor the pressed record to the adjacent stamper, as shown in FIGURE 5e. In certain types of records, the center region is punched out after the pressing operation. This is conventional in the case of 45 r.p.m. records, for example. In this case, the mechanical anchoring may be provided by roughening the stamper surface in the central region up to a diameter of 3.8 cm. (a radius of 1.9 cm.) as shown schematically in FIGURE 5f.

As shown schematically in FIGURES 6a and 6b, mechanical ejectors may be provided on one half of the mold to release the record from that half after a pressing operation. In FIGURE 6a, the stamper 82 is clamped to the upper half 81 of the mold by a fastening ring 83. Adjacent fastening ring 83 is an ejector 84 which is moved in the direction of the arrow when the mold is opened, as shown in FIGURE 6b, thereby releasing the rim 85 of the record from the upper stamper 82. The record is thereby retained on the lower half of the mold (not shown).

In order to release a record upon opening of the mold, several of the means illustrated in FIGURES 1 through 6 may be combined in a single press. In FIGURE 7a, the stamper 91 is clamped to the upper mold half 93 by means of a fastening ring 92. A sheet metal bracket 94 is provided on ring 92, and a portion thereof is forced downwardly away from ring 92 by means of gas pressure, when the mold is opened. The pressurized gas is introduced through a channel 95. FIGURE 7b shows the sheet metal ring 94 in its released condition. The gas is forced between the record and the mold half 93 to force them apart.

FIGURE 8 illustrates an embodiment in which the pressurized gas needed to release the record is supplied through the central portion of the mold. The centering spindle 98 is moved downwardly when the mold is opened, as shown in FIGURE 8b from its position during pressing, illustrated in FIGURE 8a. Pressurized gas is then forced through the channel 99 and penetrates between the surface of the record and that of the stamper, effecting separation of the two.

It will be understood that the above description of the present invention is susceptible to various modifications, changes and adaptations, and the same are intended to be comprehended within the meaning and range of equivalents of the appended claims.

What is claimed is:

1. A record press including a record mold having two impression surfaces formed by stampers, and means provided at the edge of the mold and about the outer perimeter of said stampers for releasing a pressed record from a predetermined one of said stampers when the mold is opened, said means comprising an arrangement for directing pressurized gas laterally between said predetermined stamper and the pressed record for releasing the pressed record therefrom, two mold halves each including a respective one of said stampers, said releasing means including a retaining ring for fastening one of said stampers to its respective mold half, said retaining ring being formed with a channel for directing said pressurized gas between said stamper and the surface of the pressed record.

2. A record press including a record mold having two impression surfaces formed by stampers, and means provided at the edge of the mold and about the outer perimeter of said stampers for releasing a pressed record from a predetermined one of said stampers when the mold is opened, said means comprising an arrangement for directing pressurized gas laterally between said predetermined stamper and the pressed record for releasing the pressed record therefrom, two mold halves each including a respective one of said stampers; said releasing means including a retaining ring for fastening one of said stampers to its respective mold half; a bracket fastened around said retaining ring at the outer perimeter thereof and having a portion extending inwardly adjacent said retaining ring on the side thereof away from its associated mold half, said extending portion being deflectable away from said retaining ring to press against the flange of molding mixture forced from the sides of the press during a pressing operation; means forming a channel in said ring for directing said pressurized gas against said bracket to force the latter against said flange of molding mixture, said bracket also directing said pressurized gas between the surface of the pressed record and said stamper thereby separating the record from said one of said stampers.

3. A record press as defined in claim 2 further comprising means for retaining the pressed record on the other one of said stampers when the mold is opened.

References Cited by the Examiner
UNITED STATES PATENTS

| | | | |
|---|---|---|---|
| 1,915,357 | 6/1933 | Fernberg | 18—5.3 |
| 2,233,570 | 3/1941 | Amsmeier. | |
| 2,317,823 | 4/1943 | Strauss. | |
| 2,613,395 | 10/1952 | Mossler | 18—5.3 X |
| 2,715,752 | 8/1955 | Hunter | 18—5.3 |
| 2,743,478 | 5/1956 | Harlow et al. | 18—5.3 |
| 2,865,052 | 12/1958 | Wilcox | 18—2 X |
| 2,923,976 | 2/1960 | Strauss | 18—2 X |
| 2,929,105 | 3/1960 | Stark et al. | 18—2 X |
| 2,985,910 | 5/1961 | Van Houten | 18—5.3 |
| 3,004,288 | 10/1961 | Gardner. | |
| 3,104,425 | 9/1963 | Crane et al. | 18—2 X |
| 3,183,551 | 5/1965 | Johnson | 18—2 |
| 3,186,029 | 6/1965 | Joseph | 18—5.3 |

FOREIGN PATENTS 1,193,361  4/1959  France.

WILLIAM J. STEPHENSON, *Primary Examiner.*